P. J. F. BATENBURG.
TRANSMISSION MECHANISM FOR MOTOR DRIVEN VEHICLES.
APPLICATION FILED FEB. 28, 1913.

1,219,529.

Patented Mar. 20, 1917.
4 SHEETS—SHEET 1.

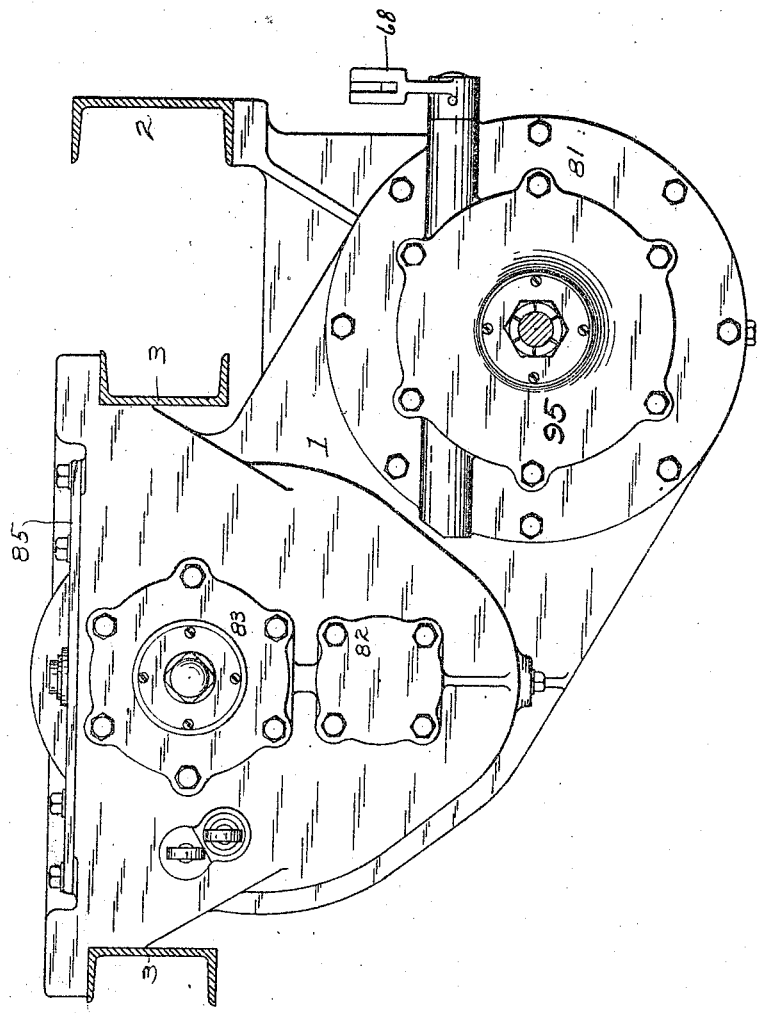

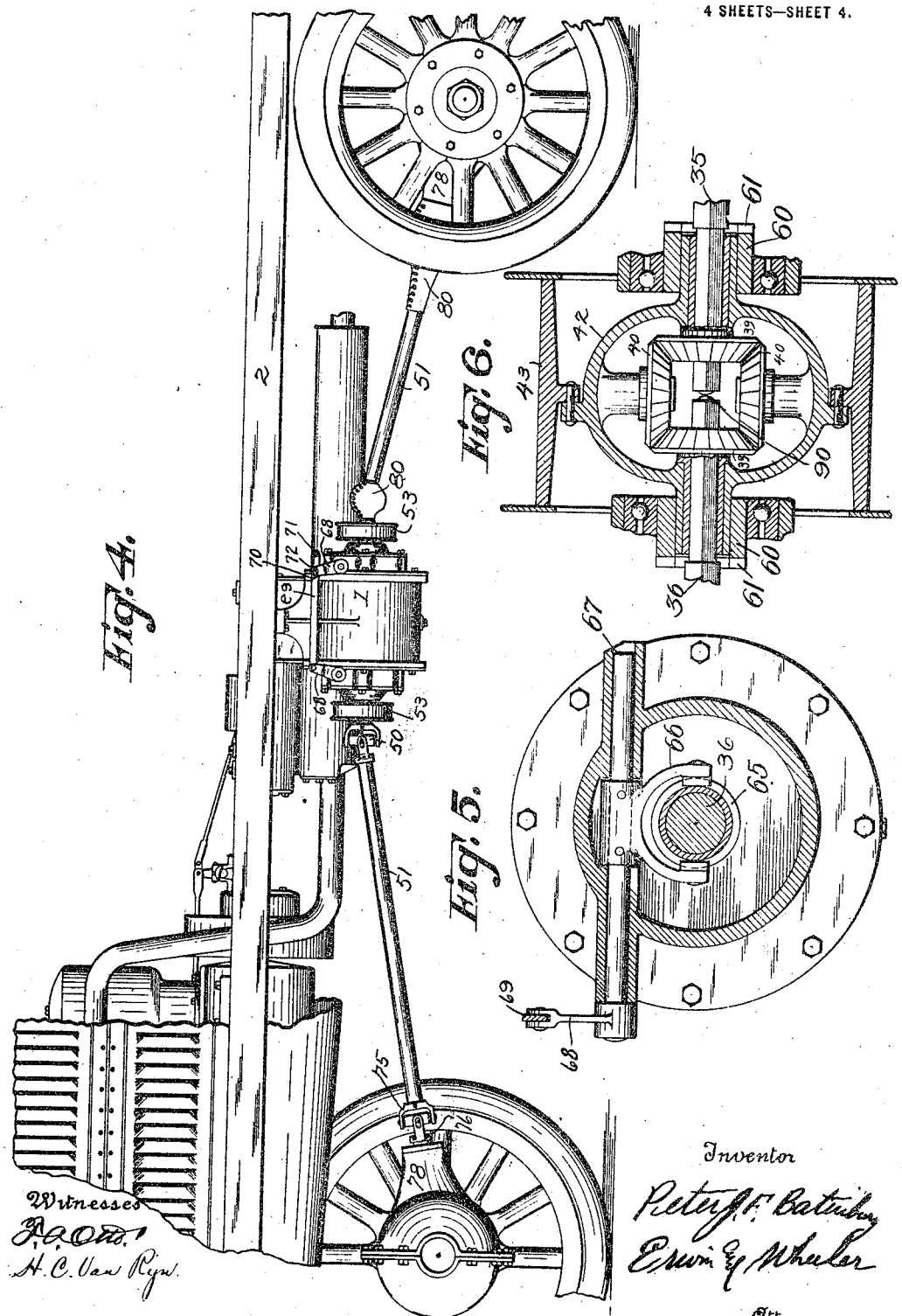

UNITED STATES PATENT OFFICE.

PETER J. F. BATENBURG, OF CLINTONVILLE, WISCONSIN, ASSIGNOR TO FOUR WHEEL DRIVE AUTO CO., OF CLINTONVILLE, WISCONSIN, A CORPORATION OF WISCONSIN.

TRANSMISSION MECHANISM FOR MOTOR-DRIVEN VEHICLES.

1,219,529.

Specification of Letters Patent. Patented Mar. 20, 1917.

Application filed February 28, 1913. Serial No. 751,197.

*To all whom it may concern:*

Be it known that I, PETER J. F. BATENBURG, a subject of Queen Wilhelmina of the Netherlands, residing at Clintonville, county of Waupaca, and State of Wisconsin, have invented new and useful Improvements in Transmission Mechanism for Motor-Driven Vehicles, of which the following is a specification.

My invention relates to improvements in transmission mechanism for motor driven vehicles, with especial reference to that class of vehicles in which the power is applied to all of the four wheels.

The object of my invention is to provide improved means for transmitting power from the engine to the live shafts of the front and rear axles with a view of securing greater stability, durability and better control than has heretofore been attained.

In the drawings—

Fig. 3 is a rear view of the parts shown in Fig. 1.

Fig. 4 is a fragmentary side elevation of a motor driven vehicle to which my invention is applied.

Fig. 5 is a detail cross sectional view, drawn on line *x—x* of Fig. 2.

Fig. 6 is a detail sectional view of the main differential gear mechanism.

Like parts are identified by the same reference characters throughout the several views.

Figure 1:
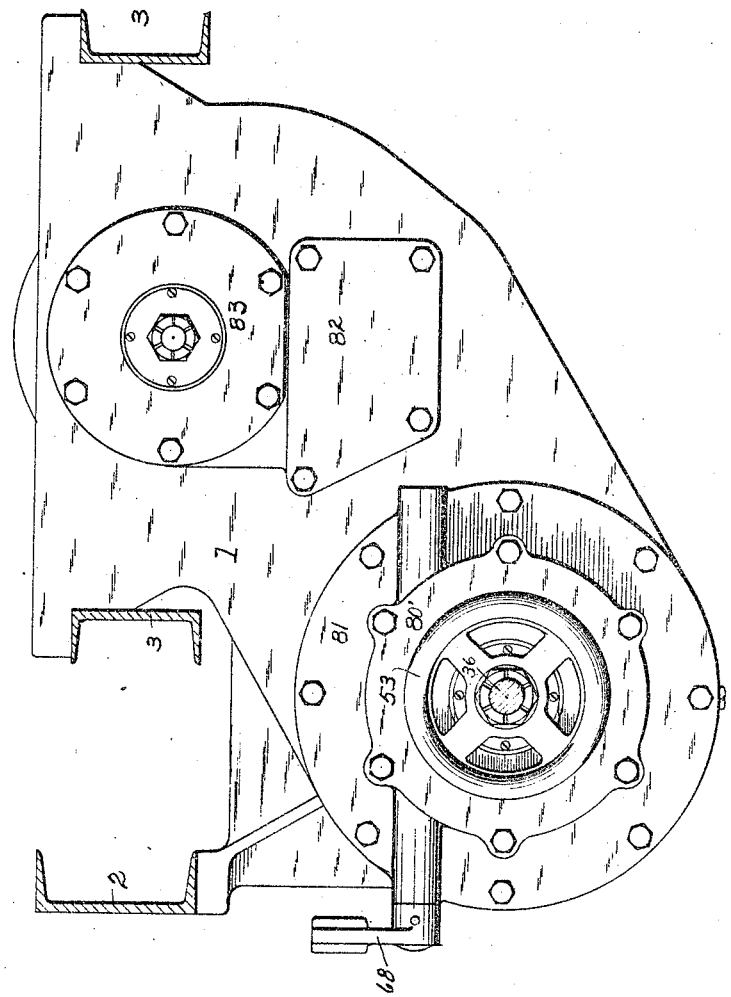
Figure 1 is a detail front view of the transmission gear casing showing one of the main frame bars and two of the sub-frame bars of the vehicle, in cross section.

The transmission gearing is enclosed in a casing 1, which is connected with a main frame bar 2 and sub-frame or auxiliary frame bars 3. The casing 1 is divided into compartments 6 and 7, by a cross partition 8. The compartment 6 contains the variable speed and reversing mechanism and the compartment 7 contains the sub-transmission or driving connections and clutches or locking mechanism for the transmission shaft.

The variable speed and reversing gearing may be of any ordinary construction. In the construction illustrated, motion is transmitted from a driving shaft 10 to a driven shaft 11, either directly through the clutch members 12 and 13, or indirectly through any selected one of a series of gear wheels 14, 15 and 16, which operate respectively to drive a countershaft 17 through gear wheels 18, 19 and 20 thereon, the motion of the countershaft being transmitted to the driven shaft 11 through gear wheels 21 and 22. The driving shaft 10 may be connected with gear wheel 14, by means of clutch members 25 and 26, or it may be connected with gear wheel 15 by clutch members 27 and 28, or with gear wheel 16 by clutch members 29 and 30, the several pairs of clutch members being adapted for mutual engagement by proper movement of the clutch shifting collars 32. The arrangement of the shafts, gears, and clutches in this variable speed mechanism is well known in this art and in itself constitutes no part of my present invention. It is therefore not described with further particularity.

The driving members 35 and 36 of the transmission reach are actuated by differential gear members 39 and 40, as shown in Fig. 6. The gear members 40 are mounted on suitable interior trunnions carried by a casing member 42, to the outer surface of which a sprocket pulley 43 is secured. Motion is transmitted from the shaft 11 to the sprocket pulley 43 through sprocket pulley 44 and belt 45. All of these parts are located within chamber 7 of the casing 1, but the shafts 35 and 36 extend through the walls of the casing to the exterior and have universally jointed connection at 50 with the inclined members 51 of the transmission reach. Brake drums 53 are mounted upon the shafts 35 and 36 respectively, and brake bands 54 connected with the casing 1 are adapted to be set in binding relation upon these drums by means of levers 55 actuated from any desired point by means of flexible connections 56.

The gear wheels 39 of the differential gearing are nonrotatably, but loosely mounted on the shafts 35 and 36 respectively. The casing 42 is provided with sleeve clutch members 60, the jaws 61 of which are adapted to be engaged by clutch members 62 mounted upon squared portions of the shafts 35 and 36 respectively, and adapted to be moved longitudinally of their respective shafts into and out of engagement with the jaws 61. Each of these shifting clutch members 62 is provided with a groove 65, loosely engaged by a forked arm 66 carried by a rock shaft 67, extending through the wall of casing 1. The rock shafts are provided with upwardly projecting arms 68 which are connected by an extensible link in the form of a bar 69, having a set of holes 70 and 71 for the coupling bolt 72 which connects it with one of the arms 68. When the link is coupled at 71, the clutch members 62 are out of engagement and the transmission to the reach members is through the driven gear wheel of the differential gear set. When coupled at 72, both clutches are in locking engagement with the casing clutches and the transmission shafts are directly connected with the driving or casing member 42 of the differential. This will be done only in case it is desired to uncouple one of the transmission reaches and drive to either front or rear axle only, or in case any of the wheels are out of contact with the ground. As such conditions occur only occasionally, and the adjustment of the link 69 may be made while the vehicle is at rest, I prefer to not complicate the structure by providing means for effecting this adjustment from the driver's seat. The lower ends of the inclined transmission shaft members 51 are universally jointed at 75 with transmission shaft members 76, which enter the axle differential casing 78, as shown in Fig. 4. The universal joints at 50 and 75 are preferably inclosed by non-metallic flexible coverings 80, as shown at the rear in Fig. 4, said coverings being omitted from the front portion of the transmission reach in Fig. 4, in order to expose the joints 50 and 76.

The casing 1 is preferably a one piece casing, having end caps 95, 81, 82 and 83 at its respective ends, and another cap 85 at the top, affording access to the interior for the purpose of inserting, removing or repairing the mechanism inclosed therein. Said casing 1 is therefore rigid in structure, and particularly so since it is reinforced by the partition 8. This is a feature of great importance, since the mechanism inclosed within the casing is unaffected by the vibrations and torsional movements of the vehicle, all parts of said mechanism being maintained continuously in the same relative position. I also attach great importance to the partition 8, since it allows the transmission gears to be submerged in grease without affecting the operation of the chain 45, a supply of oil being preferably maintained in the chamber 7.

Another important feature of my invention is the provision of means for simultaneously engaging and disengaging the driving members 35 and 36 of the transmission reach with the driving member of the differential gears through the medium of the clutch members 62, this feature being employed in combination with means for independently controlling the motion of said shafts 35 and 36 through the medium of the brake bands 54, operating on the shaft drums 53. It is obvious that by separately applying a brake to each of the shafts 35 and 36, the relative movement of said shafts may be controlled, whereby skidding is prevented, such as might occur in case the front wheels encounter a considerably greater resistance than that encountered by the rear wheels. Another advantage of the arrangement, however, is in the fact that in stopping the vehicle, the transmission and variable speed gears are relieved of strain, since the brake pressure is applied between these gears and the traction wheels, and ordinarily, therefore, the connections to the brake bands will be made through an equalizer whereby both brakes will be applied simultaneously and with equal pressure.

I also attach great importance to the fact that my improved structure allows for the use of a belt 45 for transmitting motion from the shaft 11 to the main differential, the belt being located within the casing and completely protected from dirt and grit. By using such a belt, the grinding noise produced by intermeshing gear wheels is almost wholly obviated, and a silently running mechanism is produced.

Figure 2:
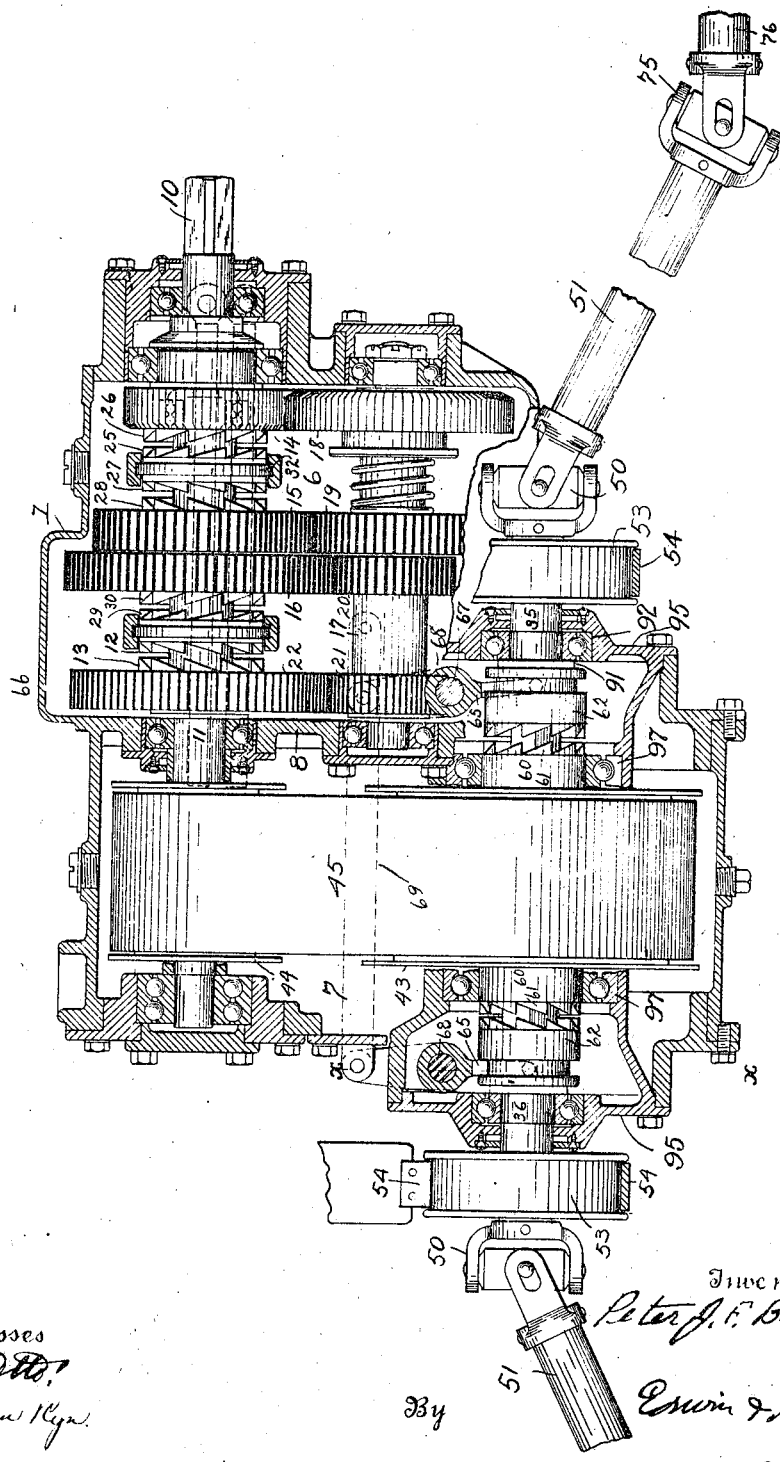
Fig. 2 is a view of the transmission gearing, the casing being shown in section on a diagonal plane common to the central or driving members of the transmission shaft and the driving and driven shafts of the variable speed mechanism.

It will be observed in Figs. 2 and 6, that the transmission shaft members 35 and 36 are provided with thrust bearing members 90 at their abutting ends, (Fig. 6) and the transmission reach members 51 and 76 are in slotted coupling relation at the universal joints 50 and 75. The shaft members 35 and 36 are squared where they pass through the gear wheels 39 of the differential and are free to slide in such wheels into and out of end contact with each other. The longitudinal movements of the transmission shaft members therefore do not impart shocks to the differential gear wheels. The shaft members 35 and 36 are also provided with collars 91 which have thrust bearing upon the bearing boxes 92 mounted in the casing cap 95, and which provide out bearings for the members 35 and 36. The collars 91 limit the outward movement of the shafts 35 and 36. Both the outer bearings 92 and the inner bearings 97 are carried by the cap 95, and are removable with it.

I claim—

1. A transmission mechanism for motor driven vehicles, including the combination with sets of front and rear driving axles and differential gearing connecting the members of each set, of an intermediate set of main differential gears, transmission shaft members detachably coupled together and adapted to transmit motion from the main differential gear set to the driving axles through the other differential gear set, and clutches adapted to connect the transmission shaft members with either the driving or driven members of the differential gear set, whereby said mechanism may be operated to drive either the front or the rear wheels or both, and either with differential or uniform movement of the transmission shaft members.

2. A transmission mechanism for motor driven vehicles, including the combination with sets of front and rear driving axles and differential gearing connecting the members of each set, of an intermediate set of main differential gears, transmission shaft members detachably coupled together and adapted to transmit motion from the main differential gear set to the driving axles through the other differential gear set, brake drums mounted on the transmission shaft members between the main differential gear set and the respective axle differential gear sets, and brakes adapted to frictionally engage the same, whereby the relative movements of the front and rear wheels may be controlled.

3. A transmission mechanism for motor driven vehicles, including the combination with sets of front and rear driving axles and differential gearing connecting the members of each set, of an intermediate set of main differential gears, transmission shaft members detachably coupled together and adapted to transmit motion from the main differential gear set to the driving axles through the other differential gear set, and a set of brakes each directly controlling the rotation of the transmission shaft members between the main differential gear set and one of the axle differential gear sets.

4. A power transmission mechanism for vehicles, including the combination with sets of front and rear driving axle members, and differential gearing connecting the members of each set, of a main frame, a set of main differential gearing supported thereby between the front and rear axles and provided with flexible driving connections, flexibly jointed transmission shaft members connecting the main differential gear set with the front and rear axle gear sets, and means for coupling the transmission shaft members with either the driving or the driven members of the main differential gear set.

5. A power transmission mechanism for vehicles, including the combination with sets of front and rear driving axle members and differential gearing connecting the members of each set, of a main frame, an oil retaining casing supported thereby, a main differential gear set in said casing, flexibly jointed transmission shaft members projecting through said casing and adapted to transmit motion from the main differential gear set to the axle gear sets, and a driving shaft having flexible belt connection within the casing, with the driving member of the main differential gear set, whereby said belt connection may operate in oil, and whereby the motor may be relieved of the shocks to which the axle and transmission members are subjected.

6. A power transmission mechanism for vehicles, including the combination with a driving shaft, a set of main differential gears, an endless belt connection between the driving shaft and the driving member of the differential gear set, sets of flexibly jointed transmission shaft members adapted to transmit power from the driven members of the main differential gear set to the respective front and rear axles of the vehicle, and means for applying a brake directly to each set of transmission shaft members.

7. A power transmission mechanism for vehicles including the combination with a driving shaft, a set of main differential gears having a driving member arranged with its axis parallel to the shaft and operatively connected therewith, a set of transmission shaft members adapted to be respectively driven by the driven differential gear members, connections between the respective shaft members and the front and rear axles, and brakes directly controlling the operation of each of said transmission shaft members.

8. A power transmission mechanism for vehicles including the combination with front and rear sets of driving axle members, differential gearing connecting the members of each set, a main frame, a pair of transmission shaft members supported thereby, main differential gearing adapted to drive said shaft members oppositely inclined, flexibly jointed connections between said members and the axle differential gear sets, coupling devices on said shaft members provided with operating arms, and an adjustable connection between said arms; said coupling members being adapted to connect said shafts with either the driving or driven members of the main differential gear set in accordance with the adjustment of the arm connections.

9. A power transmission mechanism for vehicles including the combination with front and rear sets of driving axle members, differential gearing connecting the members of each set, a main frame, a pair of transmission shaft members supported thereby, main differential gearing adapted to drive said shaft members oppositely inclined, flexibly jointed connections between said members and the axle differential gear sets, coupling devices on said shaft members provided with operating arms, and an adjustable connection between said arms, said coupling members being adapted to connect said shafts with either the driving or driven members of the main differential gear set in accordance with the adjustment of the arm connections, together with a set of brakes, one on each side of the main differential gear set and operating directly upon said transmission shaft members.

10. A transmission mechanism for motor driven vehicles, consisting in the combination of a variable speed mechanism having a driven shaft, a differential gear mechanism diagonally offset downwardly and laterally from said driven shaft, a set of transmission reach members having normally disconnected clutch members for engaging the driving member of the differential gearing, detachable motion transmitting connections between the driven member of the variable speed mechanism and the driving member of the differential gear mechanism, and flexible connections adapted to transmit motion from said transmission reach members to the respective axles, said variable speed mechanism, differential gearing and the central set of transmission reach members being supported from the main frame, and said clutch members having adjustable link connection with each other whereby they may be connected in either the engaged or disengaged position.

11. A transmission mechanism including the combination with sub-transmission mechanism, having a set of differential gears and transmission shaft members, of a casing inclosing said mechanisms, and provided with end caps through which the transmission shaft members extend, said caps being provided with inwardly projecting cylindrical members having bearings for said shafts at a plurality of points, and said bearings being removable with the caps, substantially as described.

12. In a transmission mechanism, the combination with front and rear axles of a set of transmission reach members, a set of differential gears operatively connecting said reach members between the axles and brake drums mounted upon said reach members, whereby the differential gearing and all parts of the driving mechanism therefor may be relieved from the strain of momentum pressure when brakes are applied to said drums and whereby the transmission of power to the respective axles may be effectively controlled.

13. In a transmission mechanism the combination of a set of differential gears, a set of transmission shafts operatively connected for rotation with the driven members of said gearing and movable longitudinally therethrough, said transmission shafts being in loosely jointed sections and the inner proximo sections of said shafts having thrust bearing collars adapted to limit the outward movement of the shaft.

14. In a transmission mechanism, the combination of a set of differential gears, a set of transmission shafts operatively connected for rotation with the driven members of said gearing and movable longitudinally therethrough, said transmission shafts being in loosely jointed sections and having thrust bearings at their inner ends adapted for abutting contact with each other, sleeves mounted adjacent thereto and thrust collars bearing against said sleeves whereby the outward movement of the shaft is prevented.

15. In a transmission mechanism, the combination of a set of differential gears, a transmission shaft having alined sections operatively connected for rotation with the driven members of said gearing and movable longitudinally therethrough, having thrust bearing members on their inner sections, and a casing provided with supporting bearings for the inner sections of said shafts, and collars on the sections of the shaft within the casing and arranged to resist outward movement of said sections.

16. The combination with a transmission casing, of a set of differential gears mounted therein and connected for power transmission, transmission shaft members operatively connected with the driven members of the differential gears, clutches for attaching said shaft members to the driving member of the differential gearing and casing caps through which said shafts pass, each provided with an inwardly projecting support having bearings for the transmission shaft member on opposite sides of said clutch.

In testimony whereof I affix my signature in the presence of two witnesses.

PETER J. F. BATENBURG.

Witnesses:
WALTER A. OLEN,
VALBERG M. OLEN.